United States Patent
Davis et al.

(10) Patent No.: US 6,415,674 B1
(45) Date of Patent: Jul. 9, 2002

(54) GEAR TRANSMISSION DAMPING APPARATUS AND METHOD

(75) Inventors: L. Porter Davis, Phoenix; Christopher J. Heiberg, Peoria; Jack H. Jacobs, Glendale, all of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/561,335

(22) Filed: Apr. 28, 2000

(51) Int. Cl.[7] ............................................. F16H 55/18
(52) U.S. Cl. ......................................... 74/409; 74/411
(58) Field of Search ............................. 74/411, 411.5, 74/409, 440, 572, 574

(56) References Cited

U.S. PATENT DOCUMENTS

| | | | |
|---|---|---|---|
| 4,002,043 A | * | 1/1977 | Yoshida ..................... 64/27 C |
| 5,017,178 A | * | 5/1991 | Krikke et al. ................... 464/7 |
| 5,332,070 A | | 7/1994 | Davis et al. |
| 5,535,705 A | * | 7/1996 | Eguchi et al. ........... 123/90.17 |
| 5,810,668 A | * | 9/1998 | Graham et al. ................ 464/81 |
| 5,931,052 A | * | 8/1999 | Zhao et al. .................... 74/574 |
| 6,109,129 A | * | 8/2000 | Genter et al. .................. 74/440 |

OTHER PUBLICATIONS

"Advanced 1.5Hz Passive Viscous Isolation System," L. Porter Davis, David Cunningham and John Harrell. 35th AIAA SDM Conference, Apr. 1994.

* cited by examiner

Primary Examiner—David Fenstermacher
(74) Attorney, Agent, or Firm—Charles J. Ungemach

(57) ABSTRACT

A gear drive having a third order damper operating with the antibacklash gear so as to lower the impact of the antibacklash gear at high torques to reduce gear wear while maintaining good contact with the antibacklash gear at lower torques to maintain high accuracy and bandwidth.

14 Claims, 1 Drawing Sheet

GEAR TRANSMISSION DAMPING APPARATUS AND METHOD

BACKGROUND OF THE INVENTION

1. Field of the Invention

The present invention relates to anti-backlash damping of gears and more particularly to third order damping which removes backlash and improves gear life by reducing pre-load forces and eliminating backlash crossover.

2. Description of the Prior Art

Backlash, i.e., the gap between teeth of mating gears, is inherent to most gear transmission designs. It is undesirable because it causes a dead-band which produces a loss of precision in output position and velocity control. Apparatus for reducing backlash is known in the prior art and normally takes the form of a second, or anti-backlash gear adjacent the driving gear which is substantially identical to the driving gear but is off-set there from, under the force of a pre-load mechanism such as a spring so that the combined backlash gear and driving gear fill the space between the surfaces of the driven gear teeth.

Unfortunately, the pre-load force tends to reduce gear life by causing excess wear and material fatigue. Typically, the higher the pre-load, the shorter the gear life. Also, in cases where high control bandwidth is necessary, the pre-load force is not sufficient to filly eliminate backlash "crossover" i.e. the travel of the driving gear from one flank of the driven gear to the other flank across the backlash gap. This limits the bandwidth and results in significant transmission error.

BRIEF DESCRIPTION OF THE INVENTION

The present invention overcomes the problems with anti-backlash arrangements of the prior art by using a third order damper in place of the pre-load force. Third order dampers have been described in paper by Porter Davis, David Cunningham and John Harrell presented at the 35th AIAA SDM Conference, April 1994. It may also be seen in U.S. Pat. No. 5,332,070 of Lawrence P. Davis, et al., entitled "Three Parameter Viscous Damper and Isolator" which issued Jul. 26, 1994 with serial number 51,110 and is assigned to the assignee of the present invention. Applying a third order damper to an anti-backlash gear arrangement, improves the bandwidth capability, mitigates the transmission errors, and reduces the pre-load forces to increase gear life in the anti-backlash gears of the prior art.

DETAILED DESCRIPTION OF THE PREFERRED EMBODIMENTS

Figure 1:
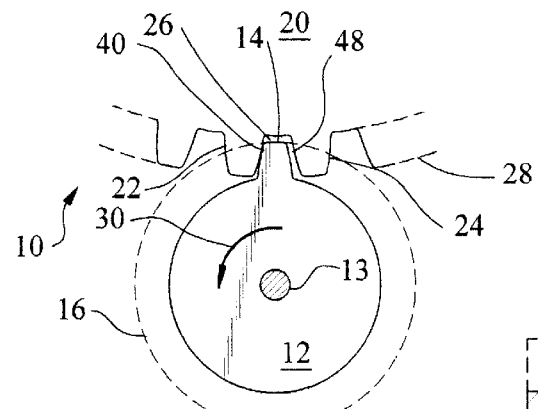
FIG. 1 is a partial view of a prior art transmission with a driving gear and a driven gear.

FIG. 1 shows a prior art transmission 10 having a driving gear 12, mounted on an axle 13 and with a gear tooth 14. A single tooth is shown for convenience but it will be understood that gear 12 includes a full set of teeth shown by dashed line 16. A driven gear 20 is shown with first and second teeth 22 and 24 and a recession 26 therebetween. While two teeth 22, and 24 are shown, it is understood that a plurality of teeth shown by dashed line 28 extends in both directions.

Driving gear 12 may rotate in either direction, but in FIG. 1 it is shown rotating on axle 13 counterclockwise as shown by arrow 30. As such, the left surface of gear tooth 14 is in contact with the left flank of recession 26 at an area 40. It is seen that the right surface of gear tooth 14 is out of contact with the right flank of recession 26 and a gap 48 exists which produces the undesirable dead band. More particularly, when driving gear 12 rotates in the clockwise direction the tooth 14 must move across gap 48 before its right surface can contact the right surface of recession 26 and produce any motion of driven gear 20. Furthermore, the continual collision at areas such as 40, causes excessive wear and fatigue in the gear teeth.

Figure 2:
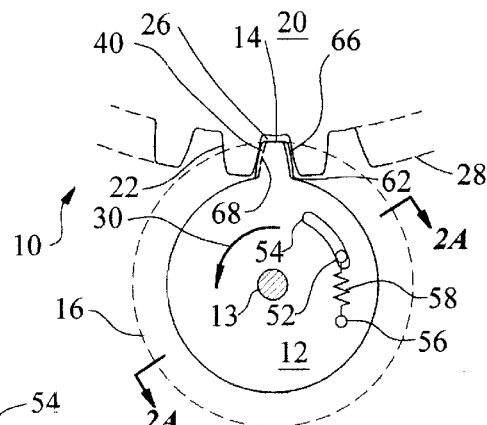
FIG. 2 is partial view of a prior art anti-backlash mechanism in the transmission of FIG. 1.
Figure 2A:
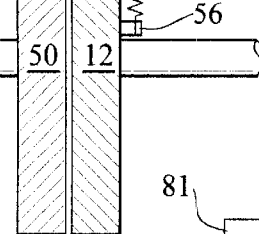
FIG. 2a is a side view of FIG. 2 taken along lines 2A—2A showing the pre-load force production in the anti-backlash gear.

A lessening of the backlash has been obtained in the prior art as is shown in FIGS. 2 and 2A. FIG. 2 is similar to FIG. 1 and uses the same reference numerals for those parts which are the same. In FIGS. 2 and 2A, a second driving, or anti-backlash gear 50, best seen in FIG. 2A, is mounted contiguous to the driving gear 12 about axle 13 but not connected thereto. Anti-backlash gear 50 has a pin 52 extending from its right surface through a curved slot 54 cut through driving gear 12. Driving gear 12 has a pin 56 extending from its right surface and a spring 58 is connected between pins 52 and 56. Spring 58 exerts a force on driving gear 12 and anti-backlash gear 50 so as to pull anti-backlash gear in a clockwise direction and pull driving gear 12 in a counterclockwise direction. Slot 54 allows pin 52 to move under the force of spring 58 until the right surface of a tooth 62 on anti-backlash gear 50 comes into contact with the right flank of recession 26 at an area 66. A portion of tooth 62 is seen in FIG. 2 to the right of tooth 14 of driving gear 12 and the rest of tooth 62 is shown by dashed lines 68.

The problems encountered with the apparatus of FIGS. 2 and 2A is that the force exerted by the spring 58 pushes tooth 14 to the left and tooth 62 to the right by an amount that causes excessive wear and fatigue on the contact points 40 and 66. Using a spring with less force allows the rotation of gear 12 to overcome the spring force and gears 12 and 50 move more together producing the backlash gap again. Even with a spring having enough force to hold the teeth 14 and 62 in contact at areas 40 and 66 for most driving motions, rapid turning of gears 12 and 50, as may occur in high band width applications, where both small and large motion of output gear 20 are desired, the driving force of gear 12 may still overcome the force of spring 58 to create the backlash gap.

The present invention introduces a third order damper in place of the backlash spring to modify the pre-load forces in the anti-backlash gearing of the prior art. Because a third order damper, such as shown in the above mentioned paper and patent, allows a very low pre-load stiffness during low rate operation and very high stiffness during high rate operation, it will provide a relatively large force during fast maneuvers where the driving gear exerts the most force and provide a relatively small force during slower, more exact motions where the driving gear exerts only a small force. Schematically this arrangement can be seen in FIG. 3 where the apparatus of FIG. 2 is used with the same reference numerals for parts that are the same as FIG. 2.

Figure 3:
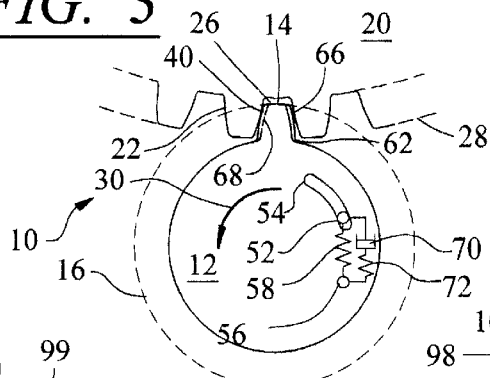
FIG. 3 is a partial view of a transmission of FIG. 2 utilizing the present invention.

FIG. 3 is like FIG. 2 except that a dashpot 70, in series with a spring 72, is shown in parallel with spring 58 between the pins 52 and 56. This combination forms a three parameter damper like that shown in the above-mentioned patent. The third order damper provided by this arrangement will produce the low pre-load stiffness at low operation rates and high pre-load stiffness at high rates as is desired. Of course, the piston type damper and springs is symbolic and other types of dampers may also be used. Furthermore, the use of springs to supply the pre-load force is only one of several ways of pre-loading the gears. However, regardless of the type of damper and of how the pre-load force is produced, the use of the third order damping will enable the transmission to achieve the desired result.

Figure 4:
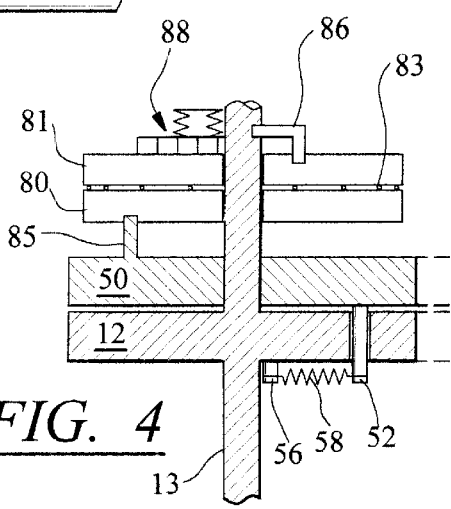
FIG. 4 is a schematic sectional view of one embodiment of the present invention.
Figure 5:
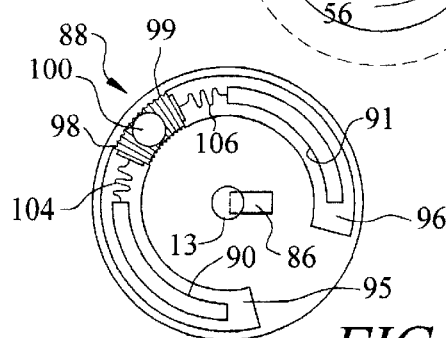
FIG. 5 is a schematic top view of the FIG. 4 embodiment.
Figure 6:
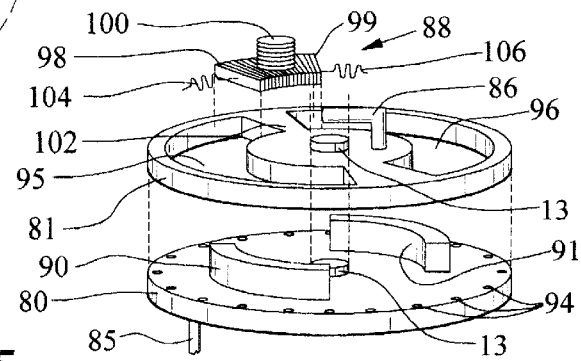
FIG. 6 is a schematic exploded perspective view of the embodiment of FIGS. 4 and 5.

FIGS. 4, 5 and 6 show one embodiment of a possible structure for supplying the pre-load force and third order damping. In FIG. 4, the driving gear 12 and the antibacklash gear 50 are shown as they were in FIG. 2A with spring 58 applying pre-load force between pin 52, connected to antibacklash gear 50, and pin 56 connected to driving gear 12. The dashpot/spring arrangement of FIG. 3 is shown as a pair of disks 80 and 81 mounted about shaft 13 for rotation with respect to each other, as, for example, by small ball bearings 83 between disks 80 and 81. Disk 80 is connected to antibacklash gear 50 by a pin 85 and disk 81 is connected to driving gear 12 by a pin 86 connected to shaft 13. A dashpot in the form of a "T" shaped bellows 88 is mounted on disk 81 and is connected to be operated on by motion of disk 80 with respect to disk 81 as will be better understood in connection with FIGS. 5 and 6.

In FIGS. 5 and 6, which are slightly enlarged for better clarity, disk 80 has a pair of abutments 90 and 91 extending upwardly and a plurality of ball bearings 94 around the periphery. Disk 81 has a pair of cutout portions 95 and 96. The "T" shaped bellows arrangement 88 includes a pair of flat bellows 98 and 99 and a vertical bellows 100 all mounted on a radial portion 102 of disk 81. Springs 104 and 106, normally in compression, are attached to bellows 98 and 99 respectively.

When disks 80 and 81 are brought together, ball bearings 94 will fit into a roller bearing track (not shown) on the underside of disk 81, and abutments 90 and 91 will extend through cut-out portions 95 and 96 to be joined at the ends with springs 104 and 106 so that upon relative motion between disks 80 and 81, abutments 90 and 91 will push against flat bellows 98 and 99 (depending on the direction of rotation) and will cause expansion and contraction forcing fluid through a restriction (not shown) into vertical bellows 100. The size of the restriction and the viscosity of the fluid will be set to provide the desired amount of damping in a well known manner.

It is seen that the damper formed by "T" shaped bellows 88 and the springs 104 and 106 is series wherewith, are arranged in parallel with the spring 58 so as to provide the desired third order damping. With high torque rotations, the damping provides high stiffness and with low torque rotations the damping provides low stiffness. The result is that the high impact of the antibacklash gear 50 against the driven gear 20 is reduced during high torque so as to provide longer life for the transmission and the full contact of the antibacklash gear 50 and the driving gear 12 are maintained for lower torques for greater accuracy and greater bandwidth.

It is thus seen that we have provided a long life, high bandwidth and high accuracy gear transmission by the use of a third order damper. Many changes to the specific disclosure used to describe the preferred embodiment will occur to those skilled in the art. For example, damper arrangements other than a "T" shaped bellows my be employed and activation arrangements other than using two disks, rotatable with respect to each other with abutments on one extending through slots in the other to activate the bellows may be devised. Accordingly, although the present invention has been described with reference to preferred embodiments, workers skilled in the art will recognize that changes may be made in form and detail without departing from the spirit and scope of the invention.

What is claimed is:

1. A transmission including a driving gear to which a driving torque may be applied,
   a driven gear in mesh with the driving gear to be driven thereby and an antibacklash gear in mesh with the driven gear to remove any gap in the mesh between the driving gear and the driven gear;
   a biasing device connected to the driving gear and the antibacklash gear to provide a force needed to remove the gap; and
   a damper mounted in parallel with the biasing device to provide a greater stiffness when greater torques are used and lesser stiffness when lesser torques are used.

2. The transmission of claim 1 wherein the damper includes a second biasing device in series therewith to provide third order damping.

3. The transmission of claim 2 wherein the damper comprises a bellows having two chambers and a restrictive passage between them and the biasing device and the second biasing device comprise springs.

4. The transmission of claim 1 wherein the driving gear and the antibacklash gear are mounted for rotation about a first shaft, the biasing device causes the antibacklash gear to be off-set from the driving gear by an amount needed to remove the gap, the damper is mounted on a first disk for rotation with the first shaft and a second disk, mounted for rotation with the antibacklash gear, includes an abutment for applying the second biasing force to the damper.

5. The method of increasing the life, increasing the bandwidth and mitigating errors between a driving gear and a driven gear in a transmission comprising the steps of:
   A. mounting an antibacklash gear proximate the driving gear;
   B. applying a biasing force between the antibacklash gear and the driving gear to remove backlash between the driving gear and the driven gear; and,
   C. applying a damping force in parallel with the biasing force.

6. Apparatus for use with a driving gear and a driven gear in which the teeth of the driving gear mesh with spaces between teeth of the driven gear but with a gap therebetween and in which an antibacklash gear is mounted proximate the driving gear but with a biasing device connected to the driving gear and the antibacklash gear to produce an overlap therebetween which causes the antibacklash gear to fill the gap, comprising:
   a damping device connected to one of the driving and antibacklash gears; and,
   a force producing device connected between the other of the driving and antibacklash gears and the damping device to form a third order damper in parallel with the biasing device.

7. The apparatus of claim 6 wherein the biasing device and the force producing device includes a spring.

8. Apparatus according to claim 7 wherein the damping device comprises a dashpot.

9. Apparatus according to claim 7 wherein the damping device comprises a first and second bellows with a restrictive passage therebetween.

10. A geared transmission including:

a first gear having teeth and spaces therebetween mounted for rotation about a first axis;

a second gear having teeth and spaces therebetween mounted for rotation about a second axis parallel to the first axis, the teeth of the first gear fitting within the spaces of the second gear with a gap which produces backlash;

a third gear, having teeth and spaces therebetween and shaped like the first gear, mounted for rotation about the first axis;

biasing means connected between the first and third gears to rotate the third gear with respect to the first gear so that the teeth of the first gear in combination with the teeth of the third gear fill the gap;

a first member mounted on the first gear to be movable therewith;

a second member mounted on the third gear to be movable therewith;

damping means having a first end portion connected to one of the first and third gears and a second end portion; and force producing means having a first end portion connected to the second end portion of the damping means and a second end portion connected to the other of the first and third gears.

11. The transmission of claim 10 wherein the biasing means comprises a spring.

12. The transmission of claim 11 wherein the force producing means comprises a spring.

13. The transmission of claim 12 wherein the damping means is a dashpot.

14. The transmission of claim 12 where in the damping means includes first and second expandable chambers with a restrictive passage therebetween.

* * * * *